United States Patent [19]
Furda et al.

[11] 3,868,465
[45] Feb. 25, 1975

[54] LOW CALORIE, COLD WATER SOLUBLE QUICK SET GELATIN DESSERT

[76] Inventors: Ivan Furda, 410 Benedict Ave., Tarrytown, N.Y. 10591; Jacob Richard Feldman, 26 Susan Dr., New City, N.Y. 10956; Donato Malizia, 4 Ashburton Pl., Yonkers, N.Y. 10701

[22] Filed: Feb. 2, 1973

[21] Appl. No.: 329,246

[52] U.S. Cl.............. 426/168, 426/213, 426/350, 426/164, 426/167, 426/214, 426/444, 426/804
[51] Int. Cl. .......................... A23l 1/04, A23g 3/00
[58] Field of Search.................. 426/168, 350, 213

[56] References Cited
UNITED STATES PATENTS

| | | | |
|---|---|---|---|
| 2,166,074 | 7/1939 | Reichel | 426/168 |
| 2,841,498 | 7/1958 | Cahn | 426/168 |
| 2,876,105 | 3/1959 | Jucaitis et al. | 426/213 |
| 3,419,402 | 12/1968 | Laskin | 426/350 |
| 3,595,675 | 7/1971 | Ash et al. | 426/168 |
| 3,642,491 | 2/1972 | Schlatter | 426/168 |

Primary Examiner—Samih N. Zaharna
Assistant Examiner—J. M. Hunter
Attorney, Agent, or Firm—Doris M. Bennett

[57] ABSTRACT

A cold water soluble, heat-reversible quick setting gelatin is made by co-drying gelatin with polyglucose along with other ingredients of a gelatin dessert type composition.

19 Claims, No Drawings

3,868,465

LOW CALORIE, COLD WATER SOLUBLE QUICK SET GELATIN DESSERT

BACKGROUND OF THE INVENTION

This invention relates to the formation of a cold water soluble quick-setting gelatin composition. More specifically, the invention pertains to the preparation of a dry mix gelatincomposition which is low in caloric content and which demonstrates non-hygroscopicity, increased gel strength and stability against realignment of the gelatin.

In the food industry, gelatin has long been used in confectionaries, jellies and ice cream not so much for its protein content since it is an incomplete protein lacking tryptophan and containing but small amounts of other important amino acids, but due largely to the gelling properties essential to the aforementioned products. Inconveniences commonly associated with gelatin-based foodstuffs however, have been the innate insolubility of gelatin in cold water, its lengthy setting time and tendency to break down under ordinary conditions of storage. Such behavioral phenomena indicate a fundamental arrangement in which the amino acid radicals are joined together by peptide linkages in chains of varying lengths and molecular weights. Due to this structural configuration therefore, the granulated gelatin when placed in cold water, tends to imbibe the water and remain as discrete, swollen particles. When heated to temperatures of about 160°F or higher, the swollen particles melt to form a dispersion and remain in the sol state unless the temperature is allowed to drop below about 120°F at which temperature the sol reverts to a gel.

The above-mentioned problem of cold water insolubility has been a continual problem plaguing food chemists. A great deal of work has been conducted on the preparation of solutions of gelatin in polyhydric alcohols as evidenced in U.S. Pat. Nos. 3,558,065 issued June 26, 1951 and 2,584,307 issued Feb. 5, 1952 but in such cases water has been present only as an accessory solvent.

An additional problem facing both food manufactures and consumers has been the tendency of the surface of the aqueous colloidal foodstuff to mature to a rubbery consistency after refrigeration storage of about 10 hours often resulting in a bloom twice that of the initial measurement.

To date, attempts to improve the cold water solubility of gelatin have shown that the same can be achieved by co-drying gelatin with sucrose or similar types of bulking agents. However, the co-drying of such components with gelatin have up to now proved unsuccessful in further eliminating the problems of gel maturation and tendency for realignment.

SUMMARY OF THE INVENTION

It has been found that by co-drying gelatin with polyglucose, a cold water soluble dry mix is obtained which in nonhygroscopic and therefore more stable against realignment of gelatin during storage than a co-dried product containing only sucrose. When placed in aqueous solution the dry mix renders a gelatin product having an increased gel strength, low in calorie content and demonstrating a reduced tendency for gel maturation during storage.

Currently, gelatin foodstuffs, primarily gelatin desserts, prepared by blending are high in sucrose content and require from 3 to 4 hours to set, due to the necessity of solubilizing the dry mix in hot water. The setting time cannot accordingly be reduced by placing the dispersion in a freezer due to the fact that the water freezes out faster than the gelatin occurs. In addition, when the gelatin-based product is stored under refrigeration for a relatively short period of time, a tough rubbery coating forms on the surface of the product.

The addition of polyglucose to a gelatin mixture whereby the polyglucose and gelatin in addition to the product ingredients are co-dried using conventional means such as freeze-drying, drum-drying, spray-drying or the like renders a low-calorie product which is not only cold-water soluble, but quick setting and having increased gel strength and a reduced tendency for realignment.

The features of this invention which are believed to be novel are distinctly set forth and claimed in the concluding portion of this specification.

DESCRIPTION OF THE INVENTION

The composition of this invention is prepared by co-drying polyglucose with gelatin and preferably with the remaining product ingredients. The co-drying of gelatin with polyglucose only and subsequent blending with the additional ingredients furnished a less readily soluble product due to the absence of sucrose which beneficially affects the rate of solubility when co-dried with the gelatin/polyglucose mixture. However, while it is recommended that the gelatin be co-dried with all the ingredients except the flavor components in order to prevent flavor losses during drying, such components may be added after the codrying of the gelatin mixture and subsequently blended therewith.

A highly soluble polymer in aqueous systems, polyglucose is acid and alkaline stable, the synthesis of which may be catalyzed by food acids such as phosphoric acid, hydrochloric acid and citric acid or the like. The polyglucose utilized in this invention has been prepared with few modifications, by phosphoric acid catalyzed polymerization of glucose as taught by the U.S. Pat. No. 2,563,014 which issued Aug. 7, 1951. The concentrated glucose solution acidified with 0.3 to 0.8% of concentrated phosphoric acid, is concentrated to dryness and heated at 125° – 140°C in a vacuum oven for about 8 to about 16 hours at about $10^{-3}$ to about $10^{-2}$ mm mercury. The acidity of the remaining polymer is neutralized with an alkaline solution.

The resulting polymers have a highly branched structure with various types of linkages from which 1–6 linkage predominates. The average degree of polymerization varies between about 20 to about 100 glucose units depending on the conditions during the preparation.

Although crude polyglucose is inherently slightly hygroscopic, it has been found to be effective for the purposes of this invention. However, further references to this compound will be directed to the ultra-filtrated polyglucose from which unreacted glucose, lower oligomers and other low molecular weight fragments have been removed by Amicon ultrafiltration through a UM2 membrane. This material is non-hygroscopic and bland. Thus, it is the preferred form of polyglucose for use in this invention.

It has been found that when polyglucose is co-dried with gelatin and preferably with other dry ingredients of the gelatin product for incorporation into a gelatin-based foodstuff, especially gelatin desserts, in addition to being cold water soluble, the co-dried composition renders a low-calorie quick setting aqueous dispersion of increased gel strength and stability against realignment. Originally, it was postulated that the increased gel strength of the resultant product was due to the formation of ester bonds resulting from phosphoric acid-catalyzed and citric acid-catalyzed syntheses of polyglucose. However, when hydrochloric acid was used in the synthesis of this glucan, the same effect was noted. It was assumed therefore, that the ester groups do not play the decisive role and the increase in bloom strength during the initial state of gelatin is due to the mutual interaction between the highly branched macromolecules of polyglucose and gelatin. The exact mechanism of this interaction is not presently known. In order that this end result be achieved however, the proportion of polyglucose to gelatin within the system as well as the amount of sucrose contained therein and the corresponding amount of artifical sweetener incorporated to replace sweetness reduction is pertinent.

The highly caloric and cariogenic sucrose serves to appreciably increase the rate of solubility of the polyglucose/gelatin mixture but nonetheless may be replaced entirely by polyglucose, the non-nutritive character of which is taught in United Kingdom Patent No. 1,182,961 issued Mar. 4, 1970. Correspondingly, an artificial sweetener, preferably the dipeptide sweetener L-aspartyl-L-phenylalanine methyl ester, may be incorporated to compensate for the displaced sweetness of sucrose in the range of about 0.05 gms to 0.1 gm per serving basis a 5:5 to 10:1 (polyglucose:sucrose) replacement of sucrose, 7:3 being preferred, or about 0.2 to about 0.5% by weight of the dipeptide sweetener according to the sweetness level to be replaced. Other artificial sweeteners such as saccharin, or mixtures of artificial sweeteners may be used and the corresponding amounts thereof calculated according to the amount of sweetness desired. The dipeptide sweeteners are preferred however, due to the absence of any aftertaste.

Accordingly, the range of gelatin to polyglucose in this invention is 1:10 to 1:5, the 1:7 ratio of gelatin to polyglucose being the preferred range in this invention and thereby corresponding to the 7:3 preferred ratio of polyglucose to sucrose. The preferred embodiment of this invention is therefore 1:7:3 (gelatin:polyglucose:sucrose), wherein L-aspartyl-L-phenylalanine is present at about 0.06 g per serving.

In accordance with this invention, the gelatinpolyglucose and sweetener mixture are combined with other dry ingredients of the gelatin product and co-dried therewith, preferably by freeze drying or spray drying. The freeze-dried non-hygroscopic mixture may subsequently be meshed to a particle size of about 7 to about 20 to increase the rate of solubility over the non-meshed substance. The particle reduction step, though preferred, is not critical to the invention as it serves only to improve the rate of solubility in cold water and does not otherwise affect the inherent characteristics of the co-dried product.

The resulting meshed dry mix has a cold water solubility rate of about 2 to 4 minutes with spoon stirring which time may be decreased to as low as 30 seconds by using more efficient methods such as Waring blenders and the like. On refrigeration, the gel setting time is approximately one hour as compared to the 3 to 4 hr. gelling period of the standard non-co-dried sucrose-laiden product (basis 4 serving quantity). The setting time may be further reduced if placed in the freezer, gelation occurring at a faster rate than crystallization as compared to the standard sucrose control.

After gelation is completed, the 1:7:3 gelatin-polyglucose-sucrose system demonstrates a gel strength about 30% stronger than the sucrose dispersion, (gelatin co-dried with sucrose) both systems containing the same quantity of gelatin having the same bloom. Thus, the preferred embodiment of this invention renders a gelatin product of the same gel strength in less than one third the time. After storage of the same under refrigeration conditions for 24 hours the polyglucose system showed a bloom of about 50 as compared to the 80 bloom gel strength of the gelatin-sucrose system, the most desirable blooms ranging from about 18 to about 40.

As is evident from the data presented herein, polyglucose, when co-dried with gelatin, in addition to rendering the gelatin cold-water soluble, serves both to initially increase the gelling capacity so as to make the dispersion quick setting and retards maturation and toughening of the gel under conditions of extended storage. This three-fold property which polyglucose has demonstrated to possess when co-dried with gelatin has not been found to exist in any other compound tested and is believed to be a unique characteristic of polyglucose.

The low-calorie, cold water soluble, quick setting gelatin blends find utility in such systems as ice cream, jellies, candies, jellied salads, gelatin desserts and the like.

The following examples are given to illustrate the present invention. It will be noted that the examples are directed mainly to the use of lower bloom gelatins. These formulae are not intended to be construed as restrictive of the invention, however, as it will be obvious to those skilled in the art that specific systems may be mentioned without limiting the scope of the invention.

EXAMPLE I

A solution is prepared in which 70% of the sucrose of a typical gelatin dessert product is replaced by polyglucose prepared by modified phosphoric acid catalyzed polymerization, in the following formulation:

25.90 g polyglucose
11.10 g sucrose
4.00 g gelatin (235 Bloom)
1.02 g adipic acid
0.11 g fumaric acid
0.37 g trisodium citrate
0.12 g color/flavor blend
0.10 g L-aspartyl-L-phenylalanine methyl ester These ingredients are dissolved in 300 ml of hot water (80° – 90°C), quickly frozen and freeze-dried. This amount corresponds to two, one-half cup servings.

The freeze dried material is meshed to a particle size of 15 U.S. mesh dissolved in 236 ml cold water (17° – 25°C) and the solution placed under refrigeration. A firm gel (18 Bloom) is formed after a refrigeration time of 35 to 45 minutes and has a caloric value of 30 calories per one-half cup serving, calculated on the basis that gelatin and polyglucose have a 3.9 and 0 caloric content per gram respectively.

EXAMPLE II

A solution is prepared in which the sucrose content in a gelatin dessert formulation is totally replaced by polyglucose as follows:

37.00 g polyglucose
4.00 g gelatin (235 Bloom)
1.02 g adipic acid
0.11 g fumaric acid
0.37 g trisodium citrate
0.12 g color/flavor blend
0.150 g L-aspartyl-L-phenylalanine methyl ester These ingredients are dissolved in 300 ml hot water (80° – 90°C) and freeze dried.

The dry mix is slightly less soluble in cold water than a system containing a small amount of sucrose as in Example I. The firm gel (18 Bloom) is formed after a refrigeration storage time of 35 to 45 minutes. The caloric value per serving of this formulation is 7.8 calories per one-half cup serving.

EXAMPLE III

A gelatin dessert composition utilizing sodium saccharin as the artificial sweetener was prepared by mixing the following dry ingredients in 300 ml of hot water (80° – 90°C).

25.90 g polyglucose
11.10 g sucrose
4.00 gelatin (235 Bloom)
1.02 g adipic acid
0.11 g fumaric acid
0.37 g trisodium citrate
0.12 g color/flavor blend
0.05 g sodium saccharin The dispersion was quickly frozen and freeze-dried. The resulting 18 Bloom gelatin formed in about 40 minutes and had a calorie content of 30 calories per serving.

What is claimed is:

1. A method of producing a low-calorie, cold water soluble, quick-setting gelatin comprising preparing a solution of polyglucose and gelatin, the proportion of gelatin to polyglucose being in the range of about 1:10 to about 1:5, and co-drying the solution, in order to derive a gelatin product of enhanced gel strength and reduced tendency to maturation.

2. The method of claim 1 wherein the proportion of gelatin to polyglucose is 1:7.

3. The method of claim 1 wherein the solution further contains sucrose.

4. The method of claim 3 wherein the sucrose is present in the proportion of about 10:1 to about 5:5 of polyglucose to sucrose.

5. The method of claim 4 wherein the sucrose is present in the proportion of about 7:3 polyglucose to sucrose.

6. The method of claim 1 wherein the solution further contains a low calorie sweetener.

7. The method of claim 6 wherein the low calorie sweetener is a dipeptide sweetener.

8. The method of claim 1 wherein the polyglucose is ultrafiltrated prior to incorporation into solution for the purpose of removing unreacted glucose, lower oligomers and low molecular weight fragments.

9. The method of claim 1 wherein the co-dried product particle size is reduced to about 7 to about 20 U.S. mesh.

10. The method of claim 1 wherein the polyglucose and gelatin are co-freeze dried.

11. The method of claim 1 wherein the polyglucose and gelatin are co-spray dried.

12. The method of claim 7 wherein the dipeptide sweetener is L-aspartyl-L-phenylalanine methyl ester.

13. A method of producing a low-calorie, cold water-soluble, quick setting gelatin dessert comprising:
   a. mixing gelatin, polyglucose, sucrose, food acid and coloring together, gelatin, polyglucose and sucrose being in a respective ratio range of about 1:10:1 to about 1:5:5 and the dry ingredients containing an effective amount of an artificial sweetener;
   b. dissolving the dry mixture in aqueous solution;
   c. co-drying the gelatin-polyglucose-sucrose solution; and
   d. said dry mixture having a particle size between about 7 to about 20 U.S. mesh size.

14. The method of claim 11 wherein gelatin-polyglucose-sucrose are in the ratio of 1:7:3.

15. The method of claim 13 wherein the polyglucose is ultrafiltrated prior to mixing for the purpose of removing unreacted glucose, lower oligomers and low molecular weight fragments.

16. A gelatin dessert composition comprising a co-dried mixture of gelatin and polyglucose in combination with sucrose, a low calorie sweetener, food acids, flavoring and coloring, the low calorie sweetener being present in amounts equivalent in sweetness to the displaced sucrose and the proportion of gelatin to polyglucose being in a range of about 1:10 to about 1:5 in order to derive a gelatin dessert product which is cold water soluble, quick-setting and of increased gel strength.

17. The gelatin dessert product of claim 14 wherein the gelatin, polyglucose and sucrose are in the respective ratio range of about 1:10:1 to about 1:5:5.

18. The gelatin dessert product of claim 16 wherein the range of gelatin to polyglucose to sucrose is 1:7:3.

19. The composition of claim 16 wherein the polyglucose is ultrafiltrated for the purpose of removing unreacted glucose, lower oligomers and low molecular weight fragments.

* * * * *